(12) United States Patent
White et al.

(10) Patent No.: US 11,174,755 B2
(45) Date of Patent: Nov. 16, 2021

(54) OIL TANK FILLING SYSTEM

(71) Applicant: Rolls-Royce plc, London (GB)

(72) Inventors: Samuel W. White, Derby (GB);
William A. Malewicz, Derby (GB);
Sebastian Ray, Derby (GB); Cristina Diaz Garcia, Derby (GB)

(73) Assignee: ROLLS-ROYCE PLC, London (GB)

( * ) Notice: Subject to any disclaimer, the term of this patent is extended or adjusted under 35 U.S.C. 154(b) by 357 days.

(21) Appl. No.: 16/387,836

(22) Filed: Apr. 18, 2019

(65) Prior Publication Data
US 2019/0338669 A1 Nov. 7, 2019

(30) Foreign Application Priority Data
May 2, 2018 (GB) ...................................... 1807200

(51) Int. Cl.
*F01D 25/18* (2006.01)
*F16N 19/00* (2006.01)
*F02C 7/06* (2006.01)

(52) U.S. Cl.
CPC ............. *F01D 25/18* (2013.01); *F16N 19/00* (2013.01); *F02C 7/06* (2013.01); *F05D 2260/98* (2013.01); *F16N 2210/02* (2013.01)

(58) Field of Classification Search
CPC ...... F01D 25/18; F16N 19/00; F16N 2210/02; F02C 7/06; F05D 2260/98
See application file for complete search history.

(56) References Cited

U.S. PATENT DOCUMENTS

| | | | | |
|---|---|---|---|---|
| 3,908,933 A | * | 9/1975 | Goss | F23R 3/60 244/3.21 |
| 4,887,424 A | * | 12/1989 | Geidel | F02C 7/14 60/39.08 |

(Continued)

FOREIGN PATENT DOCUMENTS

| | | |
|---|---|---|
| DE | 10 2011 112 254 | 3/2013 |
| EP | 1630358 | 3/2006 |

(Continued)

OTHER PUBLICATIONS

Search Report issued in connection with GB Patent Appl. No. 1807200.9 dated Oct. 30, 2018 (1 page).

(Continued)

*Primary Examiner* — Michael A Riegelman
(74) *Attorney, Agent, or Firm* — Simpson & Simpson, PLLC

(57) ABSTRACT

An oil tank filling system for filling the oil tank of a gas turbine engine. The system includes an oil tank located within the core of the engine, an engine oil filling port located on a bifurcation below the core of the engine, and an oil tank filling pipe that leads from the engine oil filling port to a tank filling port on the oil tank. The engine oil filling port is detachably connectable to an off-engine oil pump that when connected to the engine oil filling port and supplied with oil pumps oil into the engine oil filling port and through the oil tank filling pipe to the tank filling port to fill the oil tank. A method of filling the oil tank of a gas turbine engine and a gas turbine engine that includes the oil tank filling system are also disclosed.

10 Claims, 3 Drawing Sheets

(56) References Cited

U.S. PATENT DOCUMENTS

| | | | | |
|---|---|---|---|---|
| 5,610,341 A * | 3/1997 | Tortora | ............ | F01D 17/02 |
| | | | | 73/756 |
| 6,793,042 B2 * | 9/2004 | Brouillet | ............ | F01D 25/18 |
| | | | | 184/103.1 |
| 7,621,117 B2 * | 11/2009 | Dooley | ............ | F02C 7/06 |
| | | | | 60/226.1 |
| 7,966,965 B2 * | 6/2011 | Pisseloup | ............ | F01D 25/18 |
| | | | | 116/227 |
| 8,181,746 B2 * | 5/2012 | Szolomayer | ............ | F01D 25/18 |
| | | | | 184/6.11 |
| 8,627,667 B2 | 1/2014 | Lozier et al. | | |
| 8,938,944 B2 * | 1/2015 | Todorovic | ............ | B64D 33/10 |
| | | | | 60/267 |
| 9,194,294 B2 | 11/2015 | Suciu et al. | | |
| 2006/0042223 A1 * | 3/2006 | Walker | ............ | F01D 25/162 |
| | | | | 60/39.08 |
| 2006/0075754 A1 * | 4/2006 | Champion | ............ | F02C 7/36 |
| | | | | 60/772 |
| 2010/0326048 A1 * | 12/2010 | Lozier | ............ | B64D 37/04 |
| | | | | 60/262 |
| 2013/0291514 A1 * | 11/2013 | Suciu | ............ | F02C 7/12 |
| | | | | 60/39.08 |
| 2014/0010639 A1 * | 1/2014 | Snape | ............ | F01D 25/18 |
| | | | | 415/177 |
| 2014/0231437 A1 | 8/2014 | Snyder et al. | | |
| 2015/0044028 A1 * | 2/2015 | Lord | ............ | F01D 25/24 |
| | | | | 415/115 |
| 2015/0096839 A1 * | 4/2015 | Craig | ............ | F02C 7/06 |
| | | | | 184/6.1 |
| 2016/0131034 A1 * | 5/2016 | Chilton | ............ | F16C 33/6659 |
| | | | | 184/6.11 |
| 2016/0160686 A1 * | 6/2016 | Cigal | ............ | F01D 25/18 |
| | | | | 184/6.11 |
| 2016/0169042 A1 * | 6/2016 | Korn | ............ | F02C 7/06 |
| | | | | 184/6.11 |
| 2017/0130606 A1 * | 5/2017 | Niergarth | ............ | F01D 25/20 |
| 2019/0338669 A1 * | 11/2019 | White | ............ | F01D 25/20 |
| 2019/0338672 A1 * | 11/2019 | White | ............ | F01M 11/04 |
| 2019/0338673 A1 * | 11/2019 | Edwards | ............ | F02C 7/06 |
| 2019/0338674 A1 * | 11/2019 | Edwards | ............ | F01M 11/0458 |
| 2020/0025033 A1 * | 1/2020 | White | ............ | F01M 11/0458 |

FOREIGN PATENT DOCUMENTS

| | | |
|---|---|---|
| EP | 1908929 | 4/2008 |
| WO | WO 2017/109374 | 6/2017 |

OTHER PUBLICATIONS

Extended European Search Report dated Aug. 28, 2019 in connection with European Patent Application No. 19166671.8, applicant Rolls-Royce plc. (8 pages).

* cited by examiner

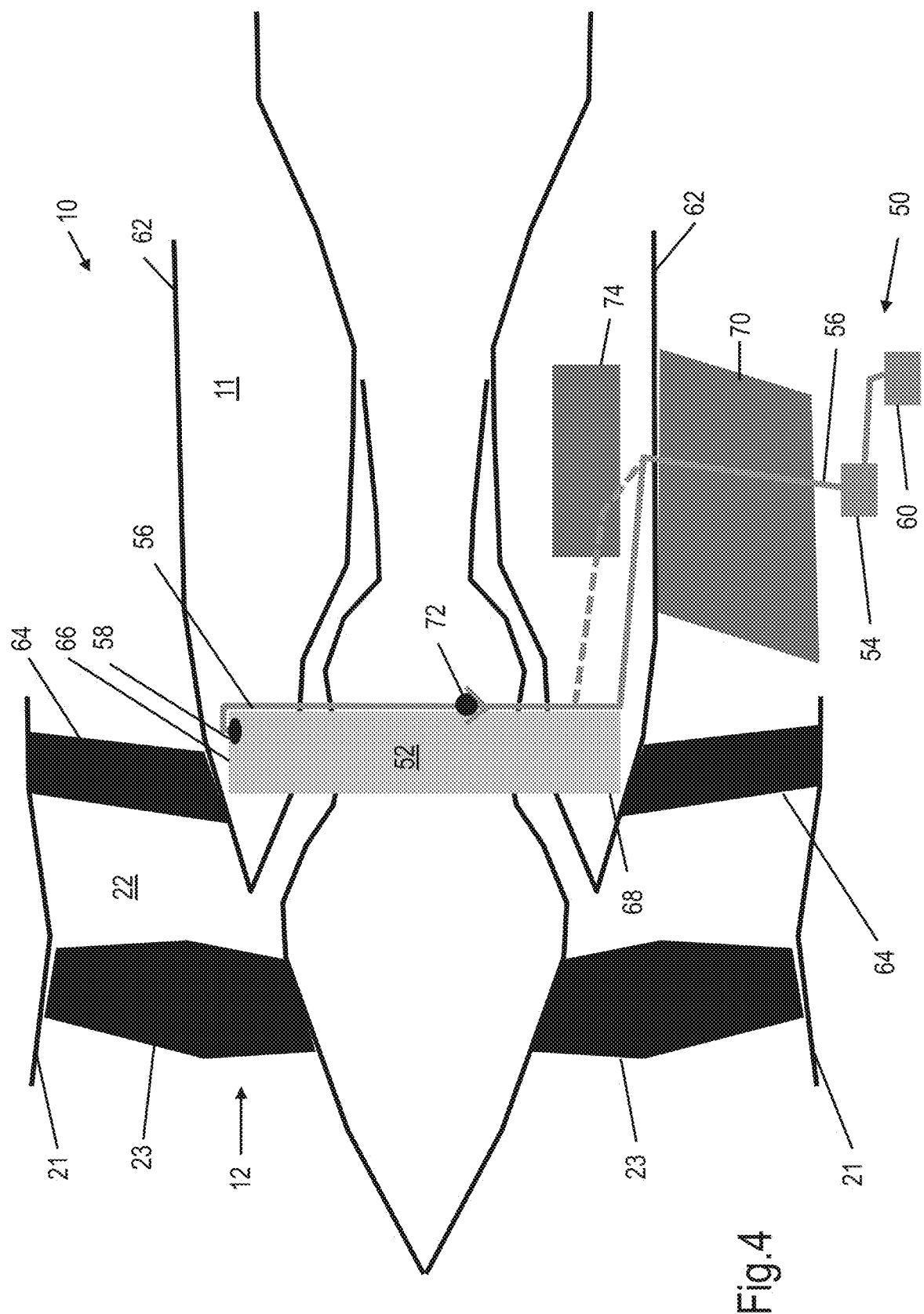

OIL TANK FILLING SYSTEM

CROSS-REFERENCE TO RELATED APPLICATIONS

This specification is based upon and claims the benefit of priority from United Kingdom patent application number GB 1807200.9 filed on May 2, 2018, the entire contents of which are incorporated herein by reference.

BACKGROUND

Field of the Disclosure

The present disclosure relates to an oil tank filling system. More particularly, the present disclosure provides an oil tank filling system that is useful for a gas turbine engine such as those used to power and propel large passenger aircraft. A method of filling the oil tank of a gas turbine engine where the oil tank is situated on the core of the engine and a gas turbine engine that includes the oil tank filling system are also disclosed.

Description of the Related Art

Gas turbine engine oil systems are in general full flow re-circulatory systems that must provide for adequate lubrication and cooling of all engine bearings, gears and drive splines under all foreseeable operating conditions.

Each gas turbine engine typically has an oil tank that supplies oil to the oil system of engine. The oil tank is typically filled through a securable opening in the tank. For turbo fan engines this opening is typically located on the fan case towards the front of the engine. For example for the Rolls-Royce® TRENT® 1000 engine, the oil tank is located on the left hand side of the fan case (viewed from the air intake). An oil filler cap is readily accessed by a maintenance engineer or service technician, who mounts a set of steps with an oil can, removes the filler cap and simply pours oil from the oil can into the oil tank.

While that method is effective for those engines and many other engines, it is not suitable, or at least not favourable, for engines where broader design reasons require the oil tank to be located within the core engine. For example, the oil tank may be housed within an engine nacelle and is therefore generally inaccessible to a maintenance engineer with an oil can or it is unsafe or at least inconvenient to be accessed by a maintenance engineer. These problems are acute when the oil tank is located below one or more outlet guide vanes (OGV) on the top of the core engine where room is tight and access is restricted by the fan case and the outlet guide vanes.

Access is especially restricted within the core engine of large turbofan engines where the large size of the fan requires a large fan case. Furthermore large turbofan engines typically need to be geared, the gears need to remain lubricated and therefore large geared turbofan engines tend to require large oil tanks.

The safety of passengers, crew and also maintenance staff is paramount to the design and operation of gas turbine engines. Furthermore it is critical to the timely maintenance of a gas turbine engine that its oil system can be filled with oil in an efficient manner.

There is therefore a need to provide oil tank filling systems for filling oil tanks that are located in a part of the engine that is not readily accessible to maintenance engineers, for example on the core engine of a turbofan engine.

U.S. Pat. No. 9,194,294 B2 discloses a turbofan gas turbine aircraft engine that has an oil tank in a core compartment and an oil fill tube, sealable with a cap and sequestable under a cover, which is mounted to the fan case and is fluidly connected to the oil tank via a fluid conduit and a tube. The fluid conduit passes through a dry cavity in the flow exit guide vane. Alternatively oil from the oil fill tube flows through a wet cavity in the flow exit guide vane to reduce piping. The gas turbine engine requires a maintenance engineer with an oil can to fill the oil tank.

U.S. Pat. No. 8,627,667 B2 discloses a turbofan gas turbine aircraft engine that has a fluid tank structure that is integrated within a bypass duct. Oil is added to the tank via a fill tube. The engine requires a maintenance engineer with an oil can to pour oil in to the fill tube to fill the oil tank.

The present disclosure provides an oil tank filling system that overcomes at least some of the above problems or at least a useful alternative to known oil tank filling systems.

SUMMARY

In a first aspect, there is provided an oil tank filling system for filling the oil tank of a gas turbine engine, the system comprises: an oil tank located within the core of the engine; an engine oil filling port located on a bifurcation below the core of the engine; and an oil tank filling pipe that leads from the engine oil filling port to a tank filling port on the oil tank; wherein the engine oil filling port is detachably connectable to an off-engine oil pump that when connected to the engine oil filling port and supplied with oil pumps oil into the engine oil filling port and through the oil tank filling pipe to the tank filling port to fill the oil tank.

The system enables an oil tank of a gas turbine engine to be filled when that oil tank that is located in a part of the engine that is not readily accessible.

It also enables the oil tank to be filled by a maintenance engineer from ground level or from a small set of steps thus avoiding the potential hazards involved in raising the maintenance engineer above the core of the engine.

This is especially useful when the engine powers a large turbofan aircraft. Being off-engine, the off-engine oil pump does not contribute to the weight of the engine.

The oil tank may have an oil tank top and an oil tank bottom and the tank filling port may be located on or adjacent the oil tank top.

The oil tank may be shaped to curve around one or both sides of the engine within the core of the engine.

The oil tank may be located between opposing outlet guide vanes.

The bifurcation may have a bifurcation base that is attached to a fan case, which is covered by a fan nacelle, and the engine oil filling port is located on the bifurcation base and accessed through an opening in the fan nacelle.

One or more temperature and/or pressure sensors may be provided alongside one or more sections of the oil tank filling pipe and communicate with a controller to provide an alert should the oil tank filling pipe burst or become blocked.

In a second aspect, there is provided a method of filling an oil tank of a gas turbine engine that is located within a core of the engine, the method comprising the steps of: connecting an off-engine oil pump to an engine oil filling port located on a bifurcation below the core of the engine; and pumping oil from the off-engine oil pump into the engine oil filling port and through an oil tank filling pipe that leads from the engine oil filling port to a tank filling port on the oil tank that is located within the core of the engine.

In a third aspect, there is provided a gas turbine engine that includes the oil tank filling system of the first aspect.

The gas turbine engine may be for an aircraft wherein the gas turbine engine comprises an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The term "core" or "core engine" as used herein means the part of a gas turbine engine that houses the compressor(s), combustor(s), turbine(s), and the core shaft(s) that connect the turbine(s) to the compressor(s). The core is typically contained within an engine nacelle.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

BRIEF DESCRIPTION OF THE DRAWINGS

Embodiments will be described by way of example only with reference to the accompanying drawings. In the drawings:

FIG. 4 is a schematic sectional view of a geared turbofan engine showing an embodiment of the oil tank filling system of the present disclosure.

Figure 1:
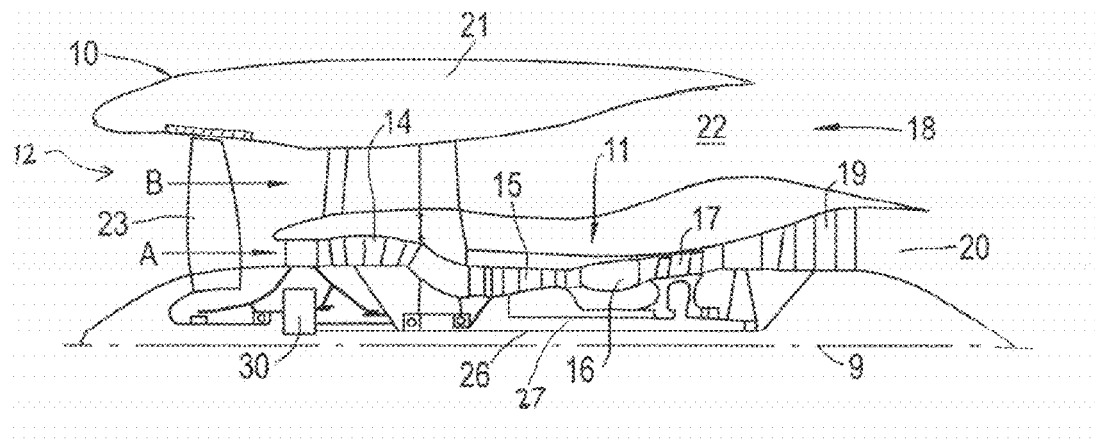
FIG. 1 is a sectional side view of a gas turbine engine.

The following table lists the reference numerals used in the drawings with the features to which they refer:

| Ref no. | Feature | FIG. |
| --- | --- | --- |
| A | Core airflow | 1 |
| B | Bypass airflow | 1 |
| 9 | Principal rotational axis (of engine) | 1, 2 |
| 10 | Gas turbine engine | 1, 4 |
| 11 | Core | 1, 4 |
| 12 | Air intake | 1, 4 |
| 14 | Low pressure compressor | 1 |
| 15 | High pressure compressor | 1 |
| 16 | Combustion equipment | 1 |
| 17 | High pressure turbine | 1 |
| 18 | Bypass exhaust nozzle | 1 |
| 19 | Low pressure turbine | 1 |
| 20 | Core exhaust nozzle | 1 |
| 21 | Fan nacelle or fan case | 1, 4 |
| 22 | Bypass duct | 1, 4 |
| 23 | Fan | 1, 2, 4 |
| 24 | Stationary supporting structure | 2 |
| 26 | Shaft | 1, 2 |
| 27 | Interconnecting shaft | 1 |
| 28 | Sun wheel or sun gear | 2, 3 |
| 30 | Epicyclic gear arrangement | 1, 2, 3 |
| 32 | Planet gears | 2, 3 |
| 34 | Planet carrier | 2, 3 |

-continued

| Ref no. | Feature | FIG. |
| --- | --- | --- |
| 36 | Linkages | 2 |
| 38 | Sun gear | 2, 3 |
| 40 | Linkages | 2 |
| 50 | Oil tank filling system | 4 |
| 52 | Oil tank | 4 |
| 54 | Engine oil filling port | 4 |
| 56 | Oil tank filling pipe | 4 |
| 58 | Tank filling port | 4 |
| 60 | Off-engine oil pump | 4 |
| 62 | Engine nacelle | 4 |
| 64 | Outlet guide vane (OGV) | 4 |
| 66 | Oil tank top | 4 |
| 68 | Oil tank bottom | 4 |
| 70 | Lower bifurcation | 4 |
| 72 | Check valve | 4 |
| 74 | Auxiliary gear box | 4 |

DETAILED DESCRIPTION OF THE DISCLOSURE

The present disclosure relates to an oil tank filling system that is useful, for example, in the gas turbine engine of an aircraft.

Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). In some alternative embodiments the core shaft may receive drive from a turbine without the core shaft also being connected to a compressor.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

In some embodiments, the or each turbine may be a centrifugal turbine.

In some embodiments, the or each compressor may be a centrifugal compressor.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a fan nacelle and/or fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

An example of a gas turbine engine for which the oil pipe failure detection system of the present disclosure is useful will now be further described with reference to the some of the drawings.

FIG. 1 illustrates a gas turbine engine 10 having a principal rotational axis 9. The engine 10 comprises an air intake 12 and a propulsive fan 23 that generates two air-flows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high-pressure turbine 17, a low pressure turbine 19 and a core exhaust nozzle 20. A fan nacelle 21 surrounds the fan case of the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The low pressure turbine 19 drives the low pressure compressor 14 via shaft 26. The fan 23 generally provides the majority of the propulsive thrust. The epicyclic gearbox 30 is a reduction gearbox.

Figure 2:
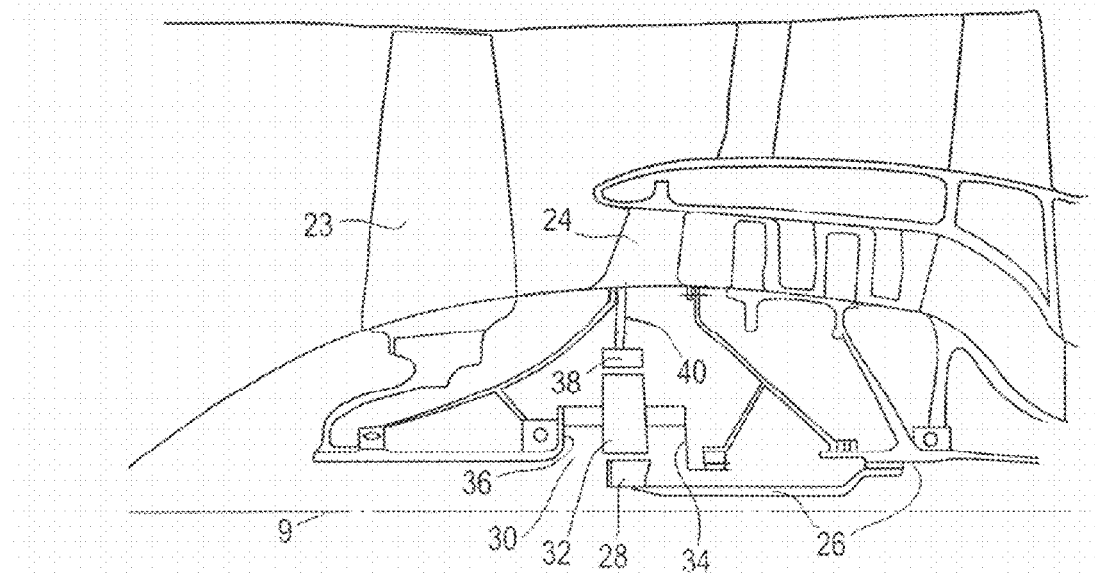
FIG. 2 is a close up sectional side view of an upstream portion of the gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
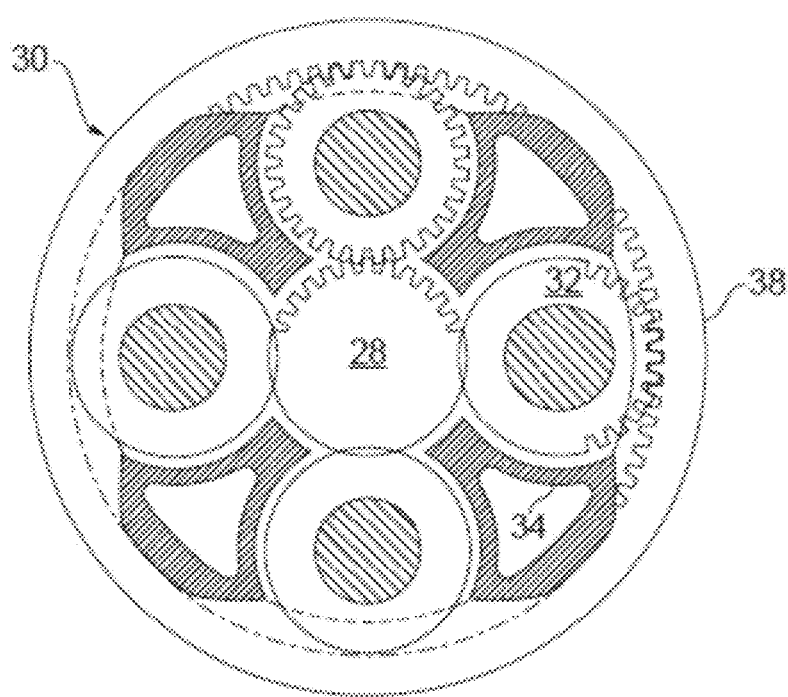
FIG. 3 is a partially cut-away view of a gearbox for the gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32. The planet gears 32 are supported for rotation on bearings. The bearings may be of any suitable kind, such as journal bearings or rolling element bearings.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a fan nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Turning now more specifically to the oil tank filling system of the present disclosure that may be used in such a gas turbine engine. The system will be described with reference to FIG. 4.

In broad terms the oil tank filling system 50 comprises an oil tank 52, an engine oil filling port 54, an oil tank filling pipe 56, a tank filling port 58 and an off-engine oil pump 60.

The oil tank 52 is located within the core 11 of the engine 10, the core being housed within an engine nacelle 62. The oil tank will have restricted access by being within the core of the engine. However even that part of the engine nacelle 62 that is adjacent or closest to the oil tank 52 may have restricted access by virtue of the presence of surrounding engine structures such as outlet guide vanes 64 or other equipment and/or components so that an oil inlet formed in that part of the engine nacelle 62 would be very difficult and/or potentially hazardous to be accessed by a maintenance engineer equipped with a simple oil can. As mentioned above, such access can be especially restricted within the core engine of a large turbofan engine where the large size of the fan requires a large fan case and other design considerations mean certain equipment is best located on the relevant part of the core.

The oil tank 52 can take a variety of shapes and configurations for the engine concerned. For example the oil tank may be shaped to curve around one or both sides of the engine 10 within the core 11 of the engine. Such an oil tank may be located between outlet guide vanes 64 on opposing parts of the core.

In FIG. 4 the oil tank 52 is shaped to curve around one side of the core 11. The oil tank 52 has an oil tank top 66 located near the top or uppermost part of the core 11 and an oil tank bottom 68 located near the bottom or lowermost part of the core 11. Access to the oil tank top 66 of the oil tank 52 is restricted by being located within the core 11 of the engine and being located directly beneath an outlet guide vane 64. Similarly access to the oil tank bottom 68 of the oil tank 52 is restricted by being located within the core 11 of the engine and being located directly above an outlet guide vane 64.

In the oil tank filling system 50 of the present disclosure access to the oil tank 52, more specifically the oil tank top 66, is obtained via the engine oil filling port 54 that is located on a lower bifurcation 70 below the core of the engine.

In gas turbine engines, more particularly turbofan engines, a bifurcation (aka Bifi or BiFi) is a conduit between the outer fan nacelle and the inner engine whose interior space often houses and protects fuel lines, hydraulic lines, conduits, electrical lines, communication links and other components that support operation of the engine. One or two bifurcations are typically provided in a gas turbine engine downstream of the outlet guide vanes (OGVs) between the inner and outer walls of the bypass duct. Bifurcations typically have aerodynamically shaped fairings around a pylon structure. Usually one bifurcation is positioned between the engine core and a pylon that mounts the engine to the wing of an aircraft. If two bifurcations are provided, the second bifurcation is generally positioned diametrically opposite the first bifurcation.

In the oil tank filling system 50 of the present disclosure the oil tank filling pipe 56 leads from the engine oil filling port 54, up through the lower bifurcation 70, through an aperture (not shown) in the engine nacelle 62 then up alongside the curved side of the oil tank 52 to the tank filling port 58 that is located on or adjacent the oil tank top 66 of the oil tank 52. The engine oil filling port 54 is detachably connectable to an off-engine oil pump 60 that when connected to the engine oil filling port 54 and supplied with oil pumps oil into the engine oil filling port 54, through the oil tank filling pipe 56, through the tank filling port 58 and into the oil tank 52 to fill the oil tank. At least one check valve 72 is included along the oil tank filling pipe 56 to prevent oil from flowing back down oil tank filling pipe 56.

The off-engine oil pump 60 can take various suitable forms but includes a supply of oil or is detachably connectable to a suitable supply of oil. By being off-engine, i.e. not forming part of the gas turbine engine 10 and only being connected to the engine on the ground when needing to add oil into the oil tank, the gas turbine engine does not need to include the weight associated with providing a pump on the engine its associated componentry. This reduction in weight can enable the gas turbine engine to achieve an associated reduction in specific fuel consumption (SFC).

If necessary the gas turbine engine 10 can include an on-engine back-up pump (not shown) or if the gas turbine engine 10 includes an auxiliary gear box (AGB) 74 that auxiliary gear box can be configured to pump oil from the oil engine filling port 54 through the oil tank filling system 50 via the auxiliary gear box 74 to fill the oil tank 52 (see the portion of the oil tank filling pipe 56 shown in broken lines passing through the auxiliary gear box 74 in FIG. 4).

The oil tank filling pipe 56 may be dedicated to its function of providing a suitable passageway for oil to flow between the engine oil filling port 54 and the tank filling port 58. However, alternatively the oil tank filling pipe 56 may be formed by using pipe work that already exists with the engine for one or more other purposes but is configured or is configurable to function as the oil tank filling pipe 56.

One or more temperature and/or pressure sensors (not shown) may be provided alongside one or more sections of the oil tank filling pipe 56 and communicate with a controller (not shown) to provide an alert should the oil tank filling pipe 56 burst or become blocked.

The engine oil filling port 54 can take various suitable forms. It is located on a bifurcation below the core 11 of the engine, i.e. on the lower bifurcation 70, so it can be readily and safely accessed by a maintenance engineer. For example, when a turbofan gas turbine engine is mounted on an aircraft the bottom of the engine nacelle 62 is typically about 2 m above the airport tarmac and the bottom of the fan nacelle 21 is about 1.2 m above the airport tarmac. This brings the lower bifurcation 70 in easy reach.

The engine oil filling port 54 can located at various positions on or within the lower bifurcation 70. The engine oil filling port 54 may, for example, be located at the base of the lower bifurcation 70 that is attached to a fan case, which is covered by the fan nacelle 21. The engine oil filling port 54 may be accessed through an opening (not shown) in the fan nacelle 21.

In use, a maintenance engineer brings an off-engine pump 60 to an aircraft on the tarmac that requires its oil tank to be filled in preparation for a flight. The maintenance engineer connects the off-engine pump 60 to the engine oil filling port 54 and operates the off-engine pump 60 to pump oil into the oil tank filling system 50. Oil is pumped from the engine oil filling port 54, through the oil tank filling pipe 56 that runs along a side of the oil tank 52 towards the tank filling port 58 that is formed in the oil tank top 66. The oil flows into the oil tank 52 to fill the tank. An oil level sensor may be provided in the oil tank 52 that communicates with a controller (not shown) in the engine and/or the off-engine pump 60 and alerts the maintenance engineer when the oil tank is full via a suitable display or indicator (not shown).

As mentioned above, the present disclosure also provides a method of filling the oil tank of a gas turbine engine that is situated within a core of the engine. The method comprises connecting the off-engine oil pump 60 to the engine oil filling port 54 located on the lower bifurcation 70 below the core 11 of the engine 10, and pumping oil from the off-engine oil pump 60 into the engine oil filling port 54 and through the oil tank filling pipe 56 that leads from the engine oil filling port 54 to a tank filling port 58 on the oil tank 52 that is located within the core 11 of the engine 10.

The method enables a maintenance engineer to fill an oil tank 52 to which access is restricted, for example by the fan nacelle 21, the fan case that is covered by the fan nacelle, one or more outlet guide vanes 64 or simply by being located within the core engine. The method also enables the oil tank 52 to be filled by a maintenance engineer from ground level or from a small set of steps thus avoiding the potential safety hazards involved in raising the maintenance engineer above the core of the engine.

The present disclosure also provides a gas turbine engine that includes the oil tank filling system 50 of the present disclosure.

That gas turbine engine can take many suitable forms, for example the gas turbine engine may be for an aircraft wherein the gas engine comprises an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

The oil tank filling system of the present disclosure is especially useful when the gas turbine engine is a turbofan engine that has a large fan and therefore a large fan case and a large fan nacelle that restricts access to the core of the engine, particularly above or below one or more outlet guide vanes on the core engine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An oil tank filling system for filling an oil tank of a gas turbine engine, the system comprises:
    an oil tank located within a core of the engine;
    an engine oil filling port located on a bifurcation below the core of the engine; and
    an oil tank filling pipe that leads from the engine oil filling port to a tank filling port on the oil tank;
    wherein the engine oil filling port is detachably connectable to an off-engine oil pump that when connected to the engine oil filling port and supplied with oil pumps oil into the engine oil filling port and through the oil tank filling pipe to the tank filling port to fill the oil tank.

2. The oil tank filling system of claim 1 wherein the oil tank has an oil tank top and an oil tank bottom and the tank filling port is located on or adjacent the oil tank top.

3. The oil tank filling system of claim 2 wherein the oil tank top is located directly beneath an outlet guide vane of the gas turbine engine, and the oil tank bottom is located directly above another outlet guide vane of the gas turbine engine.

4. The oil tank filling system of claim 1 wherein the oil tank is shaped to curve around one or both sides of the engine within the core of the engine.

5. The oil tank filling system of claim 1 wherein the oil tank is located between opposing outlet guide vanes.

6. The oil tank filling system of claim 1 wherein the bifurcation has a bifurcation base that is attached to a fan case, which is covered by a fan nacelle, and the engine oil filling port is located on the bifurcation base and accessed through an opening in the fan nacelle.

7. The oil tank filling system of claim 1 wherein one or more temperature and/or pressure sensors are provided alongside one or more sections of the oil tank filling pipe and communicate with a controller to provide an alert should the oil tank filling pipe burst or become blocked.

8. A gas turbine engine that includes the oil tank filling system of claim 1.

9. The gas turbine engine of claim 8 for an aircraft wherein the gas turbine engine comprises an engine core comprising a turbine, a compressor, and a core shaft connecting the turbine to the compressor; a fan located upstream of the engine core, the fan comprising a plurality of fan blades and a gearbox that receives an input from the core shaft and outputs drive to the fan so as to drive the fan at a lower rotational speed than the core shaft.

10. A method of filling an oil tank of a gas turbine engine that is located within a core of the engine, the method comprising the steps of:
    connecting an off-engine oil pump to an engine oil filling port located on a bifurcation below the core of the engine; and
    pumping oil from the off-engine oil pump into the engine oil filling port and through an oil tank filling pipe that leads from the engine oil filling port to a tank filling port on the oil tank that is located within the core of the engine.

* * * * *